(12) United States Patent
Ando

(10) Patent No.: US 10,456,952 B2
(45) Date of Patent: Oct. 29, 2019

(54) TIRE CURE MOLD AND METHOD OF MANUFACTURING TIRE

(71) Applicant: TOYO TIRE & RUBBER CO., LTD., Itami-shi, Hyogo (JP)

(72) Inventor: Takahiro Ando, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 16/168,049

(22) Filed: Oct. 23, 2018

(65) Prior Publication Data

US 2019/0126514 A1 May 2, 2019

(30) Foreign Application Priority Data

Oct. 27, 2017 (JP) .................. 2017-208630

(51) Int. Cl.
*B29D 30/06* (2006.01)
*B29C 33/10* (2006.01)
*B29D 30/08* (2006.01)
*B29C 37/00* (2006.01)
*B29L 30/00* (2006.01)
*B60C 11/13* (2006.01)

(52) U.S. Cl.
CPC .......... *B29C 33/10* (2013.01); *B29C 37/0053* (2013.01); *B29D 30/08* (2013.01); *B29D 30/0606* (2013.01); *B29D 2030/0612* (2013.01); *B29D 2030/0617* (2013.01); *B29L 2030/002* (2013.01); *B60C 2011/1361* (2013.01)

(58) Field of Classification Search
CPC ........ B29D 30/0606; B29D 2030/0612; B29D 2030/0617; B60C 2011/1361
See application file for complete search history.

(56) References Cited

U.S. PATENT DOCUMENTS 9,873,234 B2 * 1/2018 Ohara ................ B29D 30/0606
10,144,188 B2 * 12/2018 Ando ................ B29D 30/0606
10,239,361 B2 * 3/2019 Ichiryu .................. B29C 33/10

FOREIGN PATENT DOCUMENTS

JP      2009-18617 A      1/2009
JP      2012-236301 A    12/2012
WO     WO 98/03357    *  1/1998

* cited by examiner

*Primary Examiner* — James P Mackey
(74) *Attorney, Agent, or Firm* — Westerman, Hattori, Daniels & Adrian, LLP

(57) ABSTRACT

A tire cure mold has a tread molding face that comes in contact with a tread face of a tire set in a cavity, a protruding portion for forming a groove portion and protruding inward in a tire diametrical direction from the tread molding face, a depression for forming a groove bottom projection and formed by recessing a top face of the protruding portion, a first vent hole open in the tread molding face, a second vent hole open in a bottom face of the depression, and a spring vent mounted in the second vent hole.

8 Claims, 3 Drawing Sheets

TIRE CURE MOLD AND METHOD OF MANUFACTURING TIRE

BACKGROUND OF THE INVENTION

Field of the Invention

The present invention relates to a tire cure mold used for cure of a tire and a method of manufacturing the tire.

Description of the Related Art

A tire cure mold has a tread molding face which comes in contact with a tread face of a tire. The tread molding face is provided with a recessed and protruding shape for forming a tread pattern. The recessed and protruding shape is formed by protruding portions for forming groove portions and protruding inward in a tire diametrical direction from the tread molding face and recessed portions for forming land portions and divided by the protruding portions. The tread molding face is provided with a plurality of vent holes for exhausting excess air between the tread face of the tire and the tread molding face to an outside and the vent holes are arranged on bottom faces of the recessed portions.

In some cases, the groove portions in the tread face of the tire may be provided with groove bottom projections such as stone ejectors for preventing stone retention and tread wear indicators which indicate a usable limit reached due to wear (see Patent Documents 1 and 2, for example). Such groove bottom projections are formed by depressions which are formed by recessing top faces of the protruding portions. If air remains in the depressions in the cure, incomplete flow of rubber causes defective formation of the groove bottom projections, which may degrade appearance quality of the tire in some cases. Even if the vent holes are formed in the depressions, rubber protrusions (also called "spews") are formed due to entrance of the rubber into the vent holes and therefore degradation of the appearance quality is unavoidable.

PRIOR ART DOCUMENTS

Patent Documents

Patent Document 1 JP-A-2009-018617
Patent Document 2 JP-A-2012-236301

SUMMARY OF THE INVENTION

The present invention has been made with the above-described circumstances in view and its object is to provide a tire cure mold capable of improving appearance quality of a tire by preventing defective formation of groove bottom projections and a method of manufacturing the tire by use of the tire cure mold.

The object can be achieved by the following present invention. The present invention provides a tire cure mold comprising a tread molding face that comes in contact with a tread face of a tire set in a cavity, a protruding portion for forming a groove portion and protruding inward in a tire diametrical direction from the tread molding face, a depression for forming a groove bottom projection and formed by recessing a top face of the protruding portion, a first vent hole open in the tread molding face, a second vent hole open in a bottom face of the depression, and a spring vent mounted in the second vent hole.

Because the tire cure mold has the second vent hole open in the bottom face of the depression for forming the groove bottom projection in addition to the first vent hole open in the tread molding face, it is possible to reduce air remaining in the depression during the cure. Moreover, because the spring vent is mounted in the second vent hole, it is possible to suppress formation of a spew on the groove bottom projection. As a result, it is possible to prevent defective formation of the groove bottom projection to thereby improve appearance quality of the tire.

It is preferable that a spring vent is mounted in the first vent hole and an opening/closing stroke of the spring vent mounted in the second vent hole is shorter than an opening/closing stroke of the spring vent mounted in the first vent hole. Because the spring vent mounted in the second vent hole comes to push the uncured tire earlier than the spring vent, mounted in the first vent hole, and relatively strongly, rubber nip may occur. With the above-described structure, however, it is possible to properly bring forward the time at which the spring vent mounted in the second vent hole closes to thereby suppress occurrence of the rubber nip.

It is preferable that a spring vent is mounted in the first vent hole and an outer diameter of the spring vent mounted in the second vent hole is smaller than an outer diameter of the spring vent mounted in the first vent hole. In this case, a mark which the spring vent leaves on the groove bottom projection is less conspicuous, which effectively improves the appearance quality.

The present invention provides a method of manufacturing a tire comprising a step of performing cure by setting an uncured tire in a cavity of the tire cure mold mentioned above and heating and pressurizing the uncured tire. With this method, it is possible to prevent defective formation of the groove bottom projection as described above to thereby improve the appearance quality of the tire.

DETAILED DESCRIPTION OF THE PREFERRED EMBODIMENT

An embodiment of the present invention will be explained with reference to the drawings.

Figure 1:
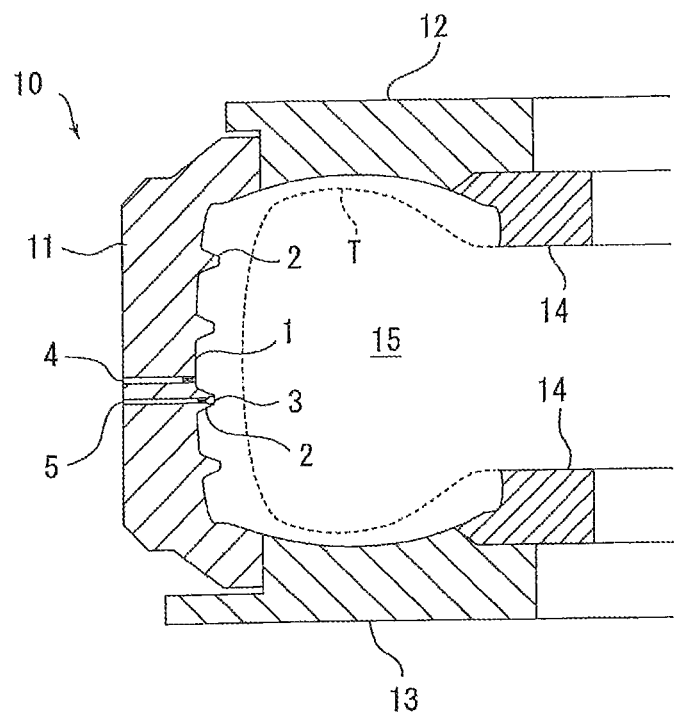
FIG. 1 is a vertical sectional view schematically showing an example of a tire cure mold according to the present invention.
Figure 2:
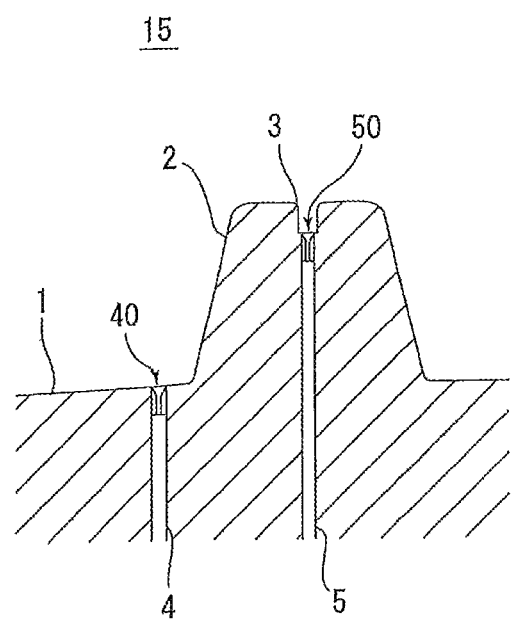
FIG. 2 is a sectional view showing an area including a protruding portion where a depression for forming a groove bottom projection is formed.
Figure 3:
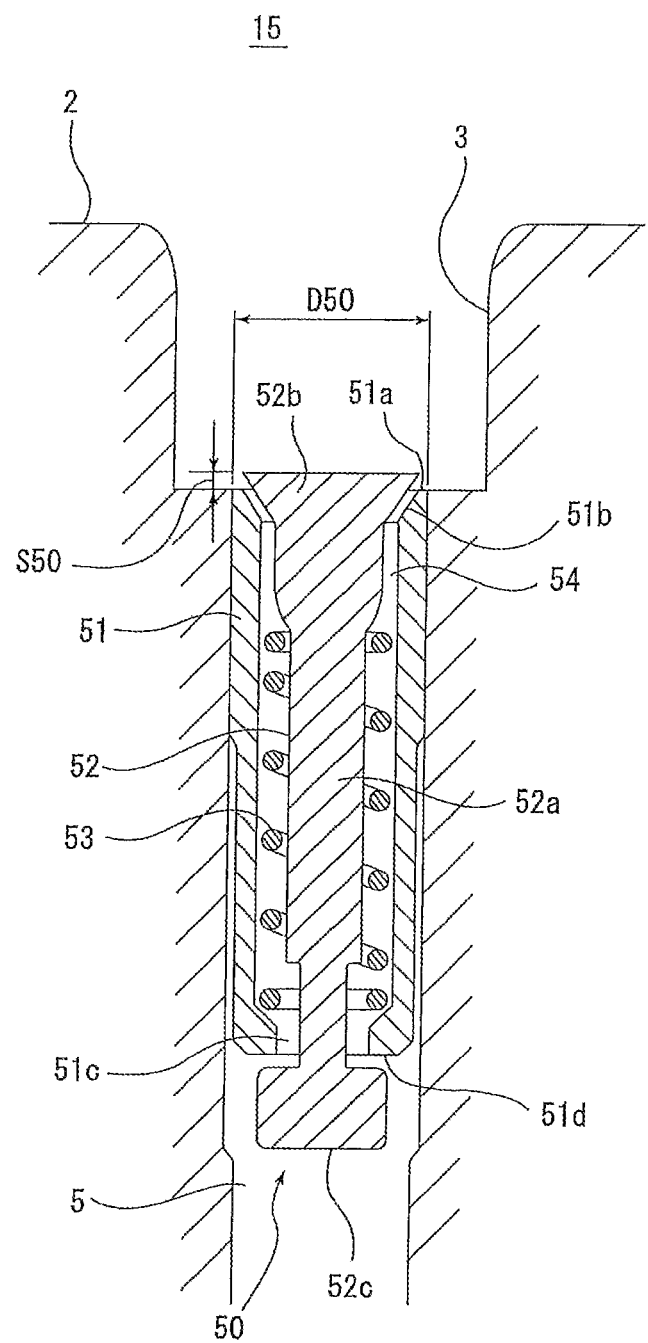
FIG. 3 is a sectional view showing a spring vent mounted in a second vent hole.
Figure 4:
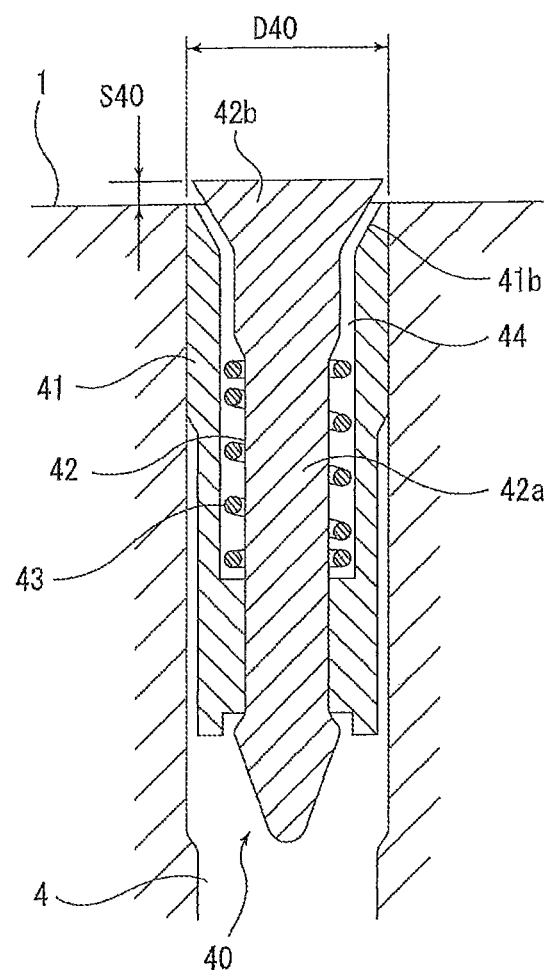
FIG. 4 is a sectional view showing a spring vent mounted in a first vent hole.

FIG. 1 shows a section of a tire cure mold 10 along a tire meridian and the tire cure mold 10 is in a clamped state. A tire T is set with a tire width direction oriented in a vertical direction. In FIG. 1, a left side corresponds to an outer side in a tire diametrical direction and a right side corresponds to an inner side in the tire diametrical direction. FIG. 2 is an enlarged view of a relevant part of FIG. 1 and FIGS. 3 and 4 are further enlarged views of relevant parts of FIG. 2. In each of FIGS. 2 to 4, a lower side corresponds to the outer side in the tire diametrical direction and an upper side corresponds to the inner side in the tire diametrical direction.

As shown in FIGS. 1 and 2, the tire cure mold 10 includes a tread molding face 1 which comes in contact with a tread face of the tire T set in a cavity 15, protruding portions 2 for forming groove portions and protruding inward in the tire diametrical direction from the tread molding face 1, depressions 3 for forming groove bottom projections and formed by recessing top faces of the protruding portions 2, vent holes 4 (first vent holes) open in the tread molding face 1, vent holes 5 (second vent holes) open in bottom faces of the respective depressions 3, and spring vents 50 (second spring vents) mounted in the respective vent holes 5. The vent holes 4, 5 connect an inside (i.e., the cavity 15) and an outside of the mold 10. Although the single vent hole 4 and the single vent hole 5 are shown in the drawings, there are actually the large number of vent holes 4 provided to the tread molding face 1 and the vent holes 5 provided to the respective depressions 3.

The tire cure mold 10 in the present embodiment includes a tread mold portion 11 for molding the tread portion of the tire T, side mold portions 12, 13 for molding sidewall portions of the tire T, and paired bead rings 14 in which bead portions of the tire T are fitted. The tread molding face 1 is provided to an inner face of the tread mold portion 11. An aluminum material is exemplified as a raw material of the tread molding face 1. The aluminum material is a concept including an aluminum alloy in addition to a pure aluminum raw material, for example, there can be listed up Al—Cu, Al—Mg, Al—Mg—Si, Al—Zn—Mg, Al—Mn and Al—Si.

The tread molding face 1 is provided with a recessed and protruding shape for forming a tread pattern. The recessed and protruding shape is formed by the protruding portions 2 (also called "bone portions") for forming the groove portions and the recessed portions for forming the land portions and divided by the protruding portions 2. Although only the protruding portions 2 extending in a tire circumferential direction are shown in the embodiment, there are actually protruding portions extending in directions crossing the tire circumferential direction. On the tread face of the tire after the cure, the land portions such as ribs and blocks are formed by rubber filled into the recessed portions and the groove portions dividing the land portions are formed by the protruding portions 2. The tread molding face 1 is the inner face of the tread mold portion 11 and also bottom faces of the recessed portions for forming the land portions. The vent holes 4 are disposed on the bottom faces of the recessed portions.

As shown in an enlarged view in FIG. 2, each of the depressions 3 is formed by recessing the top face (inner face in the tire diametrical direction) of the protruding portion 2. On groove bottoms of the groove portions of the tire after the cure, the groove bottom projections are formed by the rubber filled into the depressions 3. Although the depressions 3 have trapezoidal or rectangular sectional shapes, the depressions 3 may have other shapes. Although the depressions 3 are continuously or intermittently formed along extending directions of the protruding portions 2 in the embodiment, the depressions 3 are not limited to such depressions.

Although the groove bottom projections formed by the depressions 3 are stone ejectors for preventing stone retention in the example shown in the embodiment, the groove bottom projections are not limited to the stone ejectors. For example, the groove bottom projections may be tread wear indicators (TWI), patterns (including letters, numbers, signs, graphics, and the like) displayed on the groove bottoms, or projections formed by rubber escape grooves provided to end portions of sectors forming the tread mold portion 11.

Each of the vent holes 5 is open in the bottom portion of each of the depressions 3 and therefore open on an inner side in the tire diametrical direction of the tread molding face 1.

Because the vent hole 5 is formed, air remaining in each of the depressions 3 can be reduced in the cure. In order to efficiently exhaust the air in each of the depressions 3, it is preferable to set the vent hole 5 at an end portion or a corner portion of the depression 3. As shown in an enlarged view in FIG. 3, the spring vent 50 is mounted in the vent hole 5. The spring vent 50 is opened by biasing of a stem 52, inserted into a cylindrical housing 51, by a spring 53 and is closed by pushing down of the stem 52 by the tire T.

The spring vent 50 includes the cylindrical housing 51 having a vent path 54 in itself, the stem 52 which is inserted into the housing 51 and serves as a valve element for opening and closing the vent path 54, and the spring 53 which serves as a biasing member for biasing the stem 52 toward the cavity 15 so as to open the vent path 54. The housing 51 is fitted into the vent hole 5, which is a round hole, and fixed to a bottom face of the depression 3. At an upper end portion of the housing 51, a top face 51a facing the cavity 15 and a contact face 51b which comes in contact with a head portion 52b of the stem 52 are formed. At a lower end portion of the housing 51, a through hole 51c and a support portion 51d in a shape of an inner flange are formed.

The stem 52 has a columnar trunk portion 52a extending in an axial direction of the housing 51 and the head portion 52b which comes in contact with the contact face 51b of the housing 51 to thereby close the vent path 54. The trunk portion 52a is inserted into the spring 53 and a stopper 52c having a larger diameter than the through hole 51c is provided to a lower end of the trunk portion 52a. The head portion 52b is integrally connected to an upper end of the trunk portion 52a. The head portion 52b has a top face facing the cavity 15 and a side face facing the contact face 51b. The spring 53 is disposed to surround the trunk portion 52a and provided between the head portion 52b and the support portion 51d to bias the stem 52. Although the coil-shaped spring is used in the embodiment, the spring is not limited to the coil-shaped spring. For example, a spring in a shape of a belleville spring or a flat spring may be used, for example.

The spring vent 50 shown in the figure is in a state in which the vent path 54 is open (i.e., an open state). In the open state of the spring vent 50, the air in the cavity 15 is exhausted to the outside of the mold 10 through the vent path 54 as the tire T approaches the tread molding face 1. When the tire T pushes down the stem 52, the head portion 52b of the stem 52 comes in contact with the contact face 51b of the housing 51 to bring the spring vent 50 into a state in which the vent path 54 is closed (i.e., a closed state). An opening/closing stroke S50 corresponds to a distance over which the stem 52 is pushed down while the spring vent 50 shifts from the open state to the closed state.

Because the tire cure mold 10 has the vent holes 5 which are open in the bottom faces of the depressions 3 for forming the groove bottom projections in addition to the vent holes 4 which are open in the tread molding face 1, it is possible to reduce the air remaining in the depressions 3 during the cure. Moreover, because the spring vent 50 is mounted into each of the vent holes 5, it is possible to suppress the formation of spews on the groove bottom projections. As a result, it is possible to prevent defective formation of the groove bottom projection to thereby improve appearance quality of the tire.

In the embodiment, both of the top face 51a of the housing 51 and the top face of the head portion 52b of the stem 52 are formed by flat faces and disposed flush with the bottom face of the depression 3 in the closed state. In other words, in the closed state, the top face 51a of the housing 51 and the top face of the head portion 52b are disposed in the same plane as the bottom face of the depression 3. Therefore, no steps or lines are formed on the top face of the groove bottom projection and the spring vent 50 does not leave a conspicuous mark on the groove bottom projection, which effectively improves the appearance quality.

As shown in an enlarged view in FIG. 4, a spring vent 40 (first spring vent) is mounted in the vent hole 4 in the embodiment. The spring vent 40 includes a cylindrical housing 41 having a vent path 44 in itself, a stem 42 which is inserted into the housing 41 and serves as a valve element for opening and closing the vent path 44, and a spring 43 which serves as a biasing member for biasing the stem 42 toward the cavity 15 so as to open the vent path 44. The stem 42 has a columnar trunk portion 42a extending in an axial direction of the housing 41 and a head portion 42b which comes in contact with a contact face 41b of the housing 41 to thereby close the vent path 44. Because the spring vent 40 and the spring vent 50 have basically the same structures, further detailed description will be omitted.

If uncured rubber flowing from sides flows inside through a gap between the housing and the stem before the stem is pushed down during the cure, the influent rubber in the housing may get tangled in the spring, which is called a rubber nip phenomenon. If the rubber nip occurs, the influent rubber is not removed when the cured tire is detached from the mold and the influent rubber remaining in the housing obstructs movements of the spring to thereby cause malfunction. The rubber nip is more likely to occur in the spring vent 50 than in the spring vent 40. This is because the spring vent 50 comes to push the uncured tire earlier than the spring vent 40 and relatively strongly.

Therefore, in the embodiment, the opening/closing stroke S50 of the spring vent 50 is set to be smaller than an opening/closing stroke S40 of the spring vent 40. In this way, it is possible to properly bring forward the time at which the spring vent 50 closes to thereby suppress occurrence of the rubber nip. In this case, a difference between both the strokes (S40−S50) is set to be 0.05 mm or longer, for example.

In the embodiment, an outer diameter D50 of the spring vent 50 is smaller than an outer diameter D40 of the spring vent 40. As a result, the mark which the spring vent leaves on each of the groove bottom projections is less conspicuous, which effectively improves the appearance quality. The outer diameters D40 and D50 are respectively measured at openings of the vent holes 4, 5. In this case, a difference between both the outer diameters (D40−D50) is set to 0.3 mm or longer, for example.

The method of manufacturing the tire by using the mold 10 includes a step of performing cure by setting an uncured tire in the cavity 15 of the mold 10 and heating and pressurizing the uncured tire. The tire is expanded and deformed by inflation of a rubber bag (not shown) called bladder and the tread face of the tire comes to push the tread molding face 1. In this process, the air between the tread face of the tire and the tread molding face 1 is exhausted outside through the vent holes 4, 5. At this time, it is possible to draw the air in spaces in the vent holes 4, 5 by using a suction device to thereby enhance exhausting performance.

The above-described tire cure mold is equivalent to a normal tire cure mold except that the vent holes open in the bottom faces of the depressions for forming the groove bottom projections are provided and that the spring vents are mounted in the vent holes. Therefore, any of prior-art known shapes, materials, mechanisms, and the like can be used for the present invention.

The present invention is not limited to the embodiment mentioned above, but can be improved and modified variously within the scope of the present invention. Although the tire cure mold in the above embodiment has a mold structure including the tread mold portion and the paired side mold portions, the mold to which the present invention can be applied is not limited to this structure. For example, the present invention can be also applied to a mold structure split into upper and lower two portions at a center of a tread mold portion, for example.

What is claimed is:

1. A tire cure mold comprising:
   a tread molding face that comes in contact with a tread face of a tire set in a cavity;
   a protruding portion for forming a groove portion and protruding inward in a tire diametrical direction from the tread molding face;
   a depression for forming a groove bottom projection and formed by recessing a top face of the protruding portion;
   a first vent hole open in the tread molding face;
   a second vent hole open in a bottom face of the depression; and
   a spring vent mounted in the second vent hole.

2. The tire cure mold according to claim 1, wherein a spring vent is mounted in the first vent hole and an opening/closing stroke of the spring vent mounted in the second vent hole is shorter than an opening/closing stroke of the spring vent mounted in the first vent hole.

3. The tire cure mold according to claim 2, wherein a difference between the opening/closing stroke of the spring vent mounted in the first vent hole and the opening/closing stroke of the spring vent mounted in the second vent hole is 0.05 mm or longer.

4. The tire cure mold according to claim 1, wherein a spring vent is mounted in the first vent hole and an outer diameter of the spring vent mounted in the second vent hole is smaller than an outer diameter of the spring vent mounted in the first vent hole.

5. The tire cure mold according to claim 4, wherein a difference between the outer diameter of the spring vent mounted in the first vent hole and the outer diameter of the spring vent mounted in the second vent hole is 0.3 mm or longer.

6. The tire cure mold according to claim 2, wherein an outer diameter of the spring vent mounted in the second vent hole is smaller than an outer diameter of the spring vent mounted in the first vent hole.

7. The tire cure mold according to claim 1, wherein
   the spring vent mounted in the second vent hole includes:
      a cylindrical housing having a vent path in itself;
      a stem that is inserted into the housing and serves as a valve element for opening and closing the vent path; and
      a biasing member that biases the stem toward the cavity so as to open the vent path, and
   a top face of the housing and a top face of a head portion of the stem are disposed in the same plane as the bottom face of the depression in a closed state of the vent path.

8. A method of manufacturing a tire comprising a step of performing cure by setting an uncured tire in a cavity of the tire cure mold according to claim 1 and heating and pressurizing the uncured tire.

* * * * *